United States Patent [19]

Kobayashi et al.

[11] 4,315,081

[45] Feb. 9, 1982

[54] ANTISTATIC RESIN COMPOSITION

[75] Inventors: Akio Kobayashi; Takayuki Katto, both of Iwaki, Japan

[73] Assignee: Kureha Kagaku Kogyo Kabushiki Kaisha, Tokyo, Japan

[21] Appl. No.: 235,730

[22] Filed: Feb. 18, 1981

[30] Foreign Application Priority Data

Feb. 22, 1980 [JP] Japan ................................. 55/21172

[51] Int. Cl.$^3$ .......................... C08K 5/04; C08K 5/09; C08K 5/41; C08L 51/04
[52] U.S. Cl. ........................................ 525/2; 525/3; 525/4; 525/5; 525/64; 525/66; 525/67; 525/72; 525/74; 525/81; 525/82; 525/83; 525/85; 525/296; 525/298; 525/302; 525/303; 525/305; 525/308; 525/309; 525/310
[58] Field of Search .................... 525/64, 66, 67, 72, 525/74, 81–83, 85, 296, 298, 302, 303, 305, 308–310, 2–5

[56] References Cited

U.S. PATENT DOCUMENTS 4,115,480  9/1978  Kinoshita et al. .................. 525/305

*Primary Examiner*—Carman J. Seccuro
*Attorney, Agent, or Firm*—Wenderoth, Lind & Ponack

[57] ABSTRACT

A graft copolymer is obtained by graft-polymerizing an ethylenically unsaturated monomer onto a rubber trunk polymer which is a copolymer of a polyalkylene oxide monomer comprising 4 to 500 alkylene oxide groups together with an ethylenic unsaturation, and a conjugated diene and/or an alkyl acrylate. By adding an anionic surfactant to a base resin which comprises this graft copolymer alone or a mixture of this graft copolymer and another thermoplastic resin, an antistatic resin composition can be obtained. The resin composition thus obtained possesses excellent and permanent antistatic property that is not lowered by washing or wiping as is the case with conventional antistatic resins comprising an antistatic agent.

9 Claims, No Drawings

ANTISTATIC RESIN COMPOSITION

BACKGROUND OF THE INVENTION

The present invention relates to a resin composition comprising a base resin and a minor proportion of an anionic surfactant, which base resin is a graft copolymer alone or a mixture of the graft copolymer and a thermoplastic resin compatible therewith, the graft copolymer having been obtained by graft-polymerizing an ethylenically unsaturated monomer onto a rubber trunk polymer with low electrical resistance comprising 10 to 70% (by weight, as in all percentages and parts set forth hereinafter) of a monomer comprising 4 to 500 alkylene oxide groups and a conjugated diene and/or an alkyl acrylate.

In general, plastics have high electrical resistance and tend to be easily charged with static electricity due to friction or peeling. For this reason, plastics are liable to attract dust and dirt, resulting in various troubles such as impairment of the appearances of shaped articles, sheets, films and fibers formed from these plastics.

Methods for imparting antistatic property to such plastics that are susceptible to static electricity have been investigated and can be roughly classified as follows.

1. Methods which involve kneading an antistatic agent into plastics.
2. Methods which involve applying an antistatic agent (surfactant) over the surface of plastics.
3. Methods which involve applying a silicone compound over the surface of plastics.
4. Methods which involve chemically reforming the molecular structure of plastics.

Of these methods, a method which involves kneading an antistatic agent into plastics cannot successfully impart a permanent antistatic effect, and, when the antistatic agent present over the surface of the plastics is removed by washing with water or rubbing, the antistatic effect is lost.

As an exception, an antistatic agent of kneading-in type possessing an antiwashing property suitable for use in polyethylene, polypropylene and polyvinyl chloride has been reduced to practice. However, this antistatic agent is accompanied by certain problems. One is that a considerable time is required until its antistatic effect is restored after washing. Another is that, if an antistatic agent bleeds excessively over the surface of plastics, dust and dirt adhere thereonto. Still another problem is that a satisfactory antistatic agent has not yet been obtained for transparent and hard plastics on a commercial basis. Furthermore, this method requires a step of kneading-in an antistatic agent.

If the method which involves applying an antistatic agent over the surface of plastics is employed, its antistatic effect is drastically impaired upon washing.

The method which involves applying a silicone compound over the surface of plastics provides an excellent and substantially permanent antistatic effect but is disadvantageous from the standpoint of process efficiency and economy.

The method which involves chemically reforming the molecular structure of plastics by introducing hydrophilic groups into plastics by polymerization and the like generally requires the introduction of a considerable quantity of hydrophilic groups in order to obtain a high antistatic effect, so that the mechanical and other properties of the plastics deteriorate because of the increased hygroscopicity thereof.

SUMMARY OF THE INVENTION

As a result of our intensive investigation on processes for producing resins possessing permanent antistatic property that is not lowered by washing, we have obtained a rubber trunk polymer having a low specific volume resistivity. Further, we have found that a resin composition obtained by kneading an anionic surfactant into a base resin which comprises a graft copolymer having the rubber trunk polymer possesses a permanent antistatic effect. On the basis of these findings, we have arrived at the present invention.

More specifically, the antistatic resin composition according to the present invention comprises (1) 100 parts of a base resin; and (2) 0.1 to 5 parts of an anionic surfactant, said base resin comprising (A) 7 to 100 parts of a graft copolymer obtained by graft-polymerizing 5 to 95% of at least one ethylenically unsaturated monomer onto 5 to 95% of a rubber trunk polymer which in turn is a copolymer of (i) 30 to 90% of an elasticity-imparting monomer selected from the group consisting of conjugated dienes, alkyl acrylates and mixtures thereof, (ii) 10 to 70% of a polyalkylene oxide monomer which is a monomer comprising 4 to 500 alkylene oxide groups together with an ethylenic unsaturation, and (iii) 0 to 50% of at least one ethylenically unsaturated monomer copolymerizable with the elasticity-imparting monomer, and (B) 0 to 93 parts of a thermoplastic resin compatible with the graft copolymer (A), the rubber trunk polymer being 5 to 80% of the total of the graft copolymer (A) and the thermoplastic resin (B).

DETAILED DESCRIPTION OF THE INVENTION

Conventional antistatic resins comprising an antistatic agent seem to exhibit an antistatic effect mainly because of the antistatic agent present on the surface of a shaped resin article, and the antistatic effect is lowered by washing or wiping. However, the resin composition of the present invention possesses a permanent antistatic effect. While the function and mechanism by which such effect can be obtained is uncertain, one of the major factors may be the use of a specific graft copolymer.

More particularly, in the above-described graft copolymer or a mixture thereof with a thermoplastic resin, the rubber trunk polymer which is a copolymer of a monomer comprising alkylene oxide groups and a conjugated diene or an alkyl acrylate is considered to be dispersed during processing in grafting component resins as matrix constituents or in a mixture of grafting component resins and a thermoplastic resin in mutually bridged state, and the electric charge may be reduced mainly due to diffusion through the rubber trunk polymer phase. The presence of the monomer component comprising alkylene oxide groups seems to facilitate the diffusion or transference of the electric charge through the rubber trunk polymer. The use of a resin comprising a graft copolymer per se is the subject matter of copending U.S. Patent Ser. No. 72,846 (Masaki OHYA et al.).

Another major factor that contributes to the excellent and permanent antistatic effect of the shaped articles obtained from the resin composition of the present invention may be the addition of an anionic surfactant. The antistatic resin composition of this invention possesses an antistatic property that is not practically lowered by washing or wiping unlike conventional antistatic resins comprising an antistatic agent. The reason for this may be that the anionic surfactant added does not exhibit an antistatic effect staying on the surface of a shaped resin article as is the case with conventional antistatic resins comprising an antistatic agent, but is adsorbed onto the herein-described rubber trunk polymer comprising alkylene oxide groups and enhances the function of the diffusion and reduction of the electric charge inherent in the rubber trunk polymer per se. An anionic surfactant, as compared with a non-ionic or cationic surfactant, exhibits a particularly remarkable and permanent antistatic effect presumably because the anionic surfactant is adsorbed strikingly effectively onto the rubber trunk polymer and materially increases the diffusion and reduction function of the rubber trunk polymer.

In the resin composition of this invention, the hygroscopicity of the branch polymer phase undergoes substantially no change even if the hygroscopicity of the rubber trunk polymer phase increases, and hence the mechanical strength or heat resistance of the composition is not appreciably reduced.

As has been set forth hereinabove, the monomer comprising alkylene oxide groups must be present in the rubber trunk polymer. In the case where this monomer is present, not as a constituent of the rubber trunk polymer, but as a constituent of a random copolymer, a polymer possessing excellent antistatic property cannot be obtained as in the present invention even by the addition of an antistatic agent.

The rubber trunk polymer of the present invention is a rubbery copolymer of 30 to 90%, preferably 50 to 90%, and more preferably 60 to 90%, of an elasticity-imparting monomer selected from conjugated dienes, alkyl acrylates and mixtures thereof, 10 to 70%, preferably 10 to 50%, and most preferably 10 to 40%, of a polyalkylene oxide monomer comprising 4 to 500 alkylene oxide groups together with an ethylenic unsaturation, and optionally 0 to 50%, preferably 0 to 45%, of one or more ethylenically unsaturated monomers copolymerizable with the elasticity-imparting monomer.

This rubber trunk polymer predominantly comprises a conjugated diene and/or an alkyl acrylate as an elasticity-imparting monomer.

For the conjugated dienes, 1,3-butadiene, isoprene, chloroprene, and 1,3-pentadiene can be used.

For the alkyl acrylates, ethyl acrylate, propyl acrylate, butyl acrylate, hexyl acrylate, oxtyl acrylate, and nonyl acrylate can be used.

The quantity of the conjugated diene and/or alkyl acrylate should be not less than 30%, preferably not less than 50%, and more preferably not less than 60%, of the rubber trunk polymer. If this quantity is less than the above, the rubber trunk polymer cannot have a sufficiently low glass transition temperature, resulting in a poorer antistatic effect.

Conversely, unless this quantity is less than 90%, the quantity of the polyalkylene oxide monomer to be added will necessarily be reduced, and thus the desired antistatic effect cannot be obtained.

The polyalkylene oxide monomer comprises, in addition to an ethylenic unsaturation, a polyalkylene oxide chain or block represented by the formula:

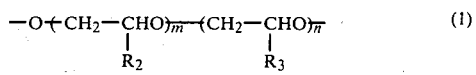

wherein each of $R_2$ and $R_3$, which may be the same or different, is hydrogen or an alkyl group having 1 to 4 carbon atoms, and m and n are integers that meet the requirement $4 \leq m+n \leq 500$. Particularly, a polyalkylene oxide monomer in which at least one of $R_2$ and $R_3$ is hydrogen and which comprises a polyethylene oxide block consisting of 4 or more ethylene oxide groups is preferred.

A preferred polyalkylene oxide monomer is one or more monomers represented by any of the following formulas (2)–(4):

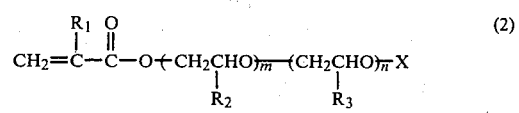

wherein $R_1$ is hydrogen or an alkyl group having 1 to 4 carbon atoms; X is hydrogen, and alkyl group having 1 to 9 carbon atoms, a phenyl group, $SO_3Me$, $SO_2Me$, $PO_3Me_2$,

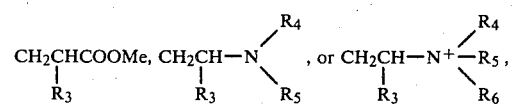

each of $R_4$, $R_5$ and $R_6$ being hydrogen or an alkyl group having 1 to 9 carbon atoms, and Me being hydrogen, Na, Li or K; and $R_2$, $R_3$, m, and n have the same meaning as in the formula (1),

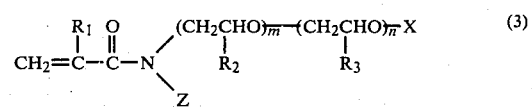

wherein Z is hydrogen, an alkyl group having 1 to 40 carbon atoms, a cycloalkyl group having 3 to 6 carbon atoms, a phenyl group, or

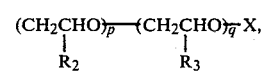

p and q being integers that meet the requirements $4 \leq p+q \leq 500$; and $R_1$ to $R_3$, X, Me, m, and n are as defined above, and

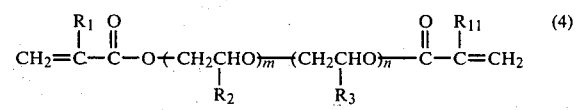

wherein $R_1$ and $R_2$, m and n are as defined above, and $R_{11}$ is hydrogen or an alkyl group having 1 to 4 carbon atoms.

Among the monomers represented by the formula (2), (3) or (4), those in which at least one of $R_2$ and $R_3$ is hydrogen and which comprises 4 or more ethylene oxide groups are particularly preferably as mentioned earlier.

It is of course possible, however, to use analogous monomers other than the monomers represented by the formula (2), (3) or (4), which comprise an ethylenic unsaturation and further can lower the volume resistivity of the rubber trunk polymer.

The polyalkylene oxide monomer comprises 4 to 500, preferably 6 to 50, and more preferably 9 to 50, alkylene oxide groups. In the case where the quantity of the alkylene oxide groups is less than 4, it is difficult to obtain an antistatic property. A polyalkylene oxide monomer comprising more than 500 alkylene oxide groups, when subjected to polymerization, is not easily soluble in water or other monomers, resulting in poor polymerizability.

Further, unless the quantity of the polyalkylene oxide monomer is less than 10% of the rubber trunk polymer, sufficient antistatic property cannot be obtained. Conversely, unless this monomer is used in a quantity less than 70%, preferably 50%, and most preferably 40%, there arises some difficulty in the polymerization required for the formation of the rubber trunk polymer or the graft copolymer as well as in post-treatments of the polymer obtained such as precipitation with an acid or salting out.

For ethylenically unsaturated monomers copolymerizable with the elasticity-imparting monomer which are optionally used in the preparation of the rubber trunk polymer, known monomers can be utilized.

For example, one or more monomers selected from methyl acrylate, alkyl methacrylates, acrylic acid, methacrylic acid, acrylamide, methacrylamide, vinyl acetate, unsaturated nitriles, aromatic vinyl monomers, alkyl vinyl ethers, alkyl vinyl ketones, 2-hydroxyethyl (meth)acrylate, diacetone acrylamide, vinyl chloride, vinylidene chloride, itaconic acid, alkyl itaconates, isobutene, 2-acid phosphoxyethyl methacrylate, 3-chloro-2-acid phosphoxypropyl methacrylate, and sodium styrenesulfonate can be used.

An improved antistatic property can be obtained by selecting as the above enumerated ethylenically unsaturated monomers copolymerizable with the elasticity-imparting monomer highly polar monomers such as acrylonitrile or monomers having an anionic substituent such as a sulfonate group, phosphate group or carboxylate group.

These ethylenically unsaturated monomers are used in a quantity of 50%, preferably 45%, or less of the monomer mixture which provides the rubber trunk polymer. If this quantity is larger than 50%, the glass transition temperature becomes higher and the rubbery property of the trunk polymer is lost.

The rubber trunk polymer can optionally comprise as a crosslinking agent a polyfunctional monomer having two or more of at least one species of ethylenically unsaturated groups, such as vinyl group, 1,3-butadienyl group, acrylic group, methacrylic group, and allyl group, in a quantity of 0 to 10% of the rubber trunk polymer. A polyfunctional monomer further comprising 4 to 500, preferably 9 to 50, polyalkylene glycol groups is particularly preferred because such a monomer acts as a crosslinking agent and simultaneously serves as an antistatic property modifier.

For the ethylenically unsaturated monomers to be graft-polymerized onto the rubber trunk polymer, known monomers can be employed. For example, one or more monomers selected from alkyl acrylates, alkyl methacrylates, acrylic acid, methacrylic acid, acrylamide, methacrylamide, vinyl acetate, unsaturated nitriles, aromatic vinyl monomers, conjugated dienes, alkyl vinyl ethers, alkyl vinyl ketones, 2-hydroxyethyl (meth)acrylate, (alkoxy)polyethylene glycol (meth)acrylates, diacetone acrylamide, vinyl chloride, vinylidene chloride, itaconic acid, alkyl itaconates, and isobutene can be used.

The proportion of the rubber trunk polymer in the graft copolymer ranges from 5 to 45%, preferably from 8 to 80%, the proportion of the branch polymer ranging from 5 to 95%, preferably from 20 to 92%. If the proportion of the rubber trunk polymer is lower than 5%, it will be difficult to obtain an antistatic property. On the other hand, the rubber trunk polymer in higher proportions results in loss of the rigidity of the graft copolymer when used singly or in poor compatibility thereof with a thermoplastic resin.

The antistatic resin composition of the present invention is a composition obtained by adding an antistatic agent selected from anionic surfactants to a base resin prepared by admixing 7 to 100 parts, preferably 10 to 100 parts, and more preferably 10 to 90 parts, of the graft copolymer (A) described above with 0 to 93 parts, preferably 0 to 90 parts, and more preferably 10 to 90 parts, of a thermoplastic resin (B) compatible with the graft copolymer (A).

The surfactant is used in a quantity of 0.1 to 5 parts, preferably 0.2 to 5 parts, and more preferably 0.3 to 3 parts, per 100 parts of the base resin. If the surfactant is used in a smaller quantity, the effect of improving the antistatic property of the resin composition becomes poor. On the other hand, the use of a greater quantity of this surfactant is undesirable because the surfactant bleeds excessively over the surface of the shaped resin article.

In a mixture of the graft copolymer and a thermoplastic resin, the rubber trunk polymer must be present in a quantity of 5 to 80%, preferably 5 to 60%, and more preferably 10 to 60%, of the mixture.

Examples of thermoplastic resins to be used in combination with the graft copolymer are polyethylene, polypropylene, polyvinyl chloride, polyvinylidene chloride, aromatic vinyl polymers, nitrile resins, polymethyl methacrylate and the copolymers thereof, acrylonitrile-styrene-butadiene resins, acrylonitrile-styrene resins, polycarbonates, polyamide resins, polyester resins, and fluoro-resins. Needless to say, any other thermoplastic resins that are compatible with the graft copolymer can be used.

For the anionic surfactants to be used in the present invention, one or more known surfactants can be utilized.

For instance, the following salts are preferable: dialkyl sulfosuccinate salts, alkylbenzene sulfonates, fatty acid salts, alkyl sulfate salts, alkylsulfonates, alkylnaphthalenesulfonates, phosphate salts, ethyl sulfo-fatty carboxylate salts, fatty alcohol sulfate salts, polyoxyethylene alkyl phenol ether sulfate salts and phosphate salts, polyoxyethylene alkyl ether sulfate salts and phosphate salts, and polyoxyethylene phosphate salts. Especially, the alkali metal salts are preferred.

The resin composition of the present invention possessing excellent antistatic property can be formed or molded by an ordinary process, for example, injection molding, extrusion molding, compression molding, or vacuum forming. Accordingly, this resin composition can be formed into plastic moldings, sheets, films, tubes, and fibers.

The resin composition of the present invention is suitable for use, for instance, in electrical appliances or accessaries thereof (e.g., cassette tape recorder cases, front covers of picture tubes, record player covers, magnetic disc covers, dust collectors of vacuum cleaners, keyboards of covers of instruments, IC element casings, mats for IC element assembly tables, and jigs); packaging materials (e.g., doll cases, cans, bottles, packaging films, perspective boards, photographic film casings, and photographic film bases); acoustic materials (e.g., audio discs, video discs, and tapes for tape recorders); building materials (e.g., wall materials, flooring materials, panels, window materials and pipes); lighting equipment (e.g., lamp shades, and displays); and plastics in general wherein an antistatic property is required.

In order to indicate more fully the nature and utility of this invention, the following specific examples of practice constituting preferred embodiments of the invention and comparison examples are set forth, it being understood that these examples are presented as illustrative only and not intended to limit the scope of the invention.

Test specimens were measured 7 days after forming upon adjusting their moisture content and 7 days after washing with water as described in Example 1. The data obtained show that the resin products according to the present invention have satisfactory antistatic property immediately after forming or washing with water. Thus, the antistatic property achieved by the present invention is not due to bleeding of the antistatic agent over the surface of the resin product with the elapse of time nor due to the moisture absorbed after forming or washing with water.

The test specimens used in Examples were prepared by pressing the resultant resin powder under heat. However, substantially the same results can be obtained with specimens prepared by pressing after kneading the powder with heated rolls or by extrusion molding through an extruder.

EXAMPLE 1

An aqueous dispersion composed of the following ingredients was adjusted to a pH of 7 with an aqueous solution of sodium hydroxide and charged into a 10-l stainless steel autoclave provided with agitating blades.

|     |     | part |
| --- | --- | --- |
| (a) | 1,3-butadiene | 12 |
|     | methyl acrylate | 4 |
|     | methoxypolyethylene glycol methacrylate (having an average of ca. 23 ethylene oxide groups) | 4 |
|     | diisopropylbenzene hydroperoxide | 0.04 |
|     | formaldehyde sodium sulfoxylate | 0.02 |
|     | ferrous sulfate heptahydrate | 0.0008 |
|     | disodium ethylenediaminetetraacetate | 0.0012 |
|     | sodium pyrophosphate | 0.01 |
|     | sodium dodecylbenzenesulfonate | 0.2 |
|     | deionized water | 60 |

The atmosphere within the autoclave was thoroughly purged with nitrogen, and the reaction mixture was agitated at 40° C. for 20 hours, whereupon a rubber latex of an average particle size of 0.08μ was obtained in a yield of 99%.

To 40 parts (10 parts as a rubber trunk polymer) of this rubber latex were added the following ingredients.

|     |     | part |
| --- | --- | --- |
| (b) | methyl methacrylate | 80 |
|     | normal octylmercaptan | 0.64 |
|     | potassium persulfate | 0.064 |
|     | sodium hydrogensulfite | 0.016 |
|     | sodium dodecylbenzenesulfonate | 0.8 |
|     | deionized water | 240 |

The atmosphere within the autoclave was purged with nitrogen, and the reaction mixture was subjected to graft copolymerization at 50° C. for 20 hours under agitation. The resulting latex was withdrawn from the autoclave, and then subjected to deposition with an aqueous aluminum sulfate solution, adjusted to a pH of 7 with an aqueous sodium pyrophosphate solution, dehydrated, washed, and dried at 55° C. for 24 hours. As a result, a white powder was obtained in a yield of 97%. 100 parts of the graft copolymer powder thus obtained was impregnated with a 10% aqueous solution of 0.5 part of sodium dioctylsulfosuccinate, and then dried completely.

This powder was kneaded with rolls having a surface temperature of 140° C. for 3 min. and pressed at 200° C. and 20 kg/cm$^2$ for 5 min. to prepare test specimens of 0.6 to 0.8 mm thickness. These test specimens were stored under normal conditions of 23° C. and 50% RH for a week, and thereafter the half-life of the charged voltage of each of the specimens was measured by means of a Static Honest Meter (mfd. by Shishido Shokai, Japan) to evaluate the antistatic property thereof. The results obtained are shown in Table 1 appearing hereinafter.

The measurement conditions were as follows.

| Applied voltage: | 8,000 V |
| --- | --- |
| Rotational speed: | 1,300 rpm |
| Humidity: | 50–55% RH |
| Temperature: | 23° C. |
| Time period: | 1 min. |

In order to evaluate the antiwashing property, the surface of each test specimen was thoroughly washed with an aqueous solution of a commercially available detergent (mfd. by Lion Yushi K.K., Japan, under the trade name "Mama Lemon") and then thoroughly washed with distilled water. The specimens were stored under the conditions of 50% RH and 23° C. for a week to adjust their moisture content, whereafter the half-life of the charged voltage was measured by means of the Static Honest Meter. The results are set forth in Table 1.

COMPARISON EXAMPLE 1

Test specimens were prepared from the graft copolymer powder of Example 1 substantially in the manner described in Example 1 except that no sodium dioctylsulfosuccinate was added. After adjustment of the moisture content of these specimens, the half-life of the charged voltage was measured by means of the Static Honest Meter. The results obtained are shown in Table 1.

TABLE 1

| | Half-life of charged voltage (sec.) | |
|---|---|---|
| | Untreated | Washed with water |
| Example 1 | 0.6 | 0.6 |
| Comparison Example 1 | 20 | 16 |

EXAMPLE 2

A graft copolymer was prepared as in Example 1 except that 9 parts of 1,3-butadiene, 7 parts of butyl acrylate, and 4 parts of methoxypolyethylene glycol methacrylate having an average of ca. 9 ethylene oxide groups were used in place of the corresponding ingredients of the rubber trunk polymer while 68 parts of methyl methacrylate, 8 parts of butyl acrylate and 4 parts of styrene were employed in place of 80 parts of the methyl methacrylate in the grafting components and 0.48 part of normal dodecylmercaptan was employed in place of 0.64 part of the normal octylmercaptan in the same components.

100 parts of this copolymer was impregnated with a 10% aqueous solution of 0.5 part of sodium dodecylbenzenesulfonate, and then dried completely.

Test specimens were prepared from the resulting copolymer by the procedure of Example 1, and the half-life of the charged voltage was measured in the same manner as in Example 1. The results obtained are set forth in Table 2.

COMPARISON EXAMPLE 2

Test specimens were prepared from the graft copolymer of Example 2 substantially in the manner described in Example 1 except that no sodium dodecylbenzenesulfonate was added.

The results of the measurement of the half-life of the charged voltage are shown in Table 2

TABLE 2

| | Half-life of charged voltage (sec.) | |
|---|---|---|
| | Untreated | Washed with water |
| Example 2 | 0.7 | 0.8 |
| Comparison Example 2 | 27 | 29 |

EXAMPLES 3 AND 4

Graft copolymers having the compositions shown in Table 3 were prepared by the procedure of Example 1 from rubber trunk polymers and branch polymers each having the same composition as that of Example 2.

The results obtained in the same manner as in Example 1 are summarized in Table 3.

To 100 parts each of the copolymers thus prepared was added 0.5 part of sodium dodecylbenzenesulfonate in the form of a 10% aqueous solution, and the mixture was dried.

Test specimens were prepared from these copolymers, and the half-life of the charged voltage was measured as in Example 1.

TABLE 3

| Example No. | Rubber trunk polymer (part by weight) | Branch polymer (part by weight) | Half-life of charged voltage (sec.) | |
|---|---|---|---|---|
| | | | Untreated | Washed with water |
| 3 | 30 | 70 | 0.6 | 0.7 |
| 4 | 50 | 50 | 0.5 | 0.5 |

EXAMPLES 5 THROUGH 11

Test specimens were prepared substantially as in Example 1 except that 0.5 part each of the surfactants shown in Table 4 was added to the graft copolymer of Example 2.

The results of the measurement of the half-life of the charged voltage by means of the Static Honest Meter are summarized in Table 4.

TABLE 4

| Example No. | Surfactant | Half-life of charged voltage (sec.) | |
|---|---|---|---|
| | | Untreated | Washed with water |
| 5 | $C_{12}H_{25}-O$\\$P(=O)(ONa)$/$C_{12}H_{25}-O$ | 0.8 | 0.8 |
| 6 | $C_{12}H_{25}-SO_3Na$ | 0.6 | 0.5 |
| 7 | $C_{12}H_{25}-SO_4Na$ | 0.5 | 0.6 |
| 8 | $C_{11}H_{21}-COOK$ | 1.2 | 1.0 |
| 9 | $C_9H_{19}-C_6H_4-O(CH_2CH_2O)_{20}SO_3Na$ | 0.6 | 0.6 |
| 10 | $C_{12}H_{25}O(CH_2CH_2O)_4SO_3Na$ | 0.6 | 0.7 |
| 11 | 1:1 mixture of $C_{18}H_{35}O(CH_2CH_2O)_7$-$P(=O)(ONa)_2$ and $C_{18}H_{35}O(CH_2CH_2O)_7$-$P(=O)(ONa)$-$OC_{18}H_{35}(CH_2CH_2O)_7$ | 0.7 | 0.8 |

EXAMPLES 12 THROUGH 22

Test specimens were prepared substantially as in Example 1 except that the monomer composition of the graft copolymer used therein was modified as shown in Table 5, and that 0.5 part of sodium dioctylsulfosuccinate was added to 100 parts each of the graft copolymer.

The antistatic property of each of the specimens was evaluated by means of the Static Honest Meter, and the results set forth in Table 5 were obtained.

TABLE 5

| Example No. | Monomer composition (wt. %) | | | | | | | Half-life of charged voltage (sec.) | |
|---|---|---|---|---|---|---|---|---|---|
| | Rubber trunk polymer | | | | Branch polymer | | | Untreated | Washed with water |
| 12 | But 12 | MA 6 | M1 2 | TDM 0.1 | MMA 80 | NOM 0.64 | | 0.6 | 0.7 |
| 13 | But 6 | MA 3 | M1 1 | | MMA 80 | MA 10 | NOM 0.72 | 4 | 4.5 |
| 14 | But 13 | St 5 | M1 2 | | MMA 70 | St 10 | NOM 0.32 | 1.5 | 1.2 |
| 15 | But 37 | St 21.5 | M2 6.5 | | MMA 21 | St 14 | NOM 0.28 | 0.4 | 0.4 |
| 16 | But 52 | St 20 | M2 8 | | St 20 | | | 0.4 | 0.4 |
| 17 | But 12 | M2 8 | | | MMA 64 | MA 16 | NOM 0.64 | 1.0 | 1.2 |
| 18 | But 13 | BA 11 | M2 6 | | MMA 59.5 | BA 7 | St 3.5 | NOM 0.42 | 0.5 | 0.6 |
| 19 | But 13 | BA 10 | M2 6 | C1 1 | MMA 59.5 | BA 7 | St 3.5 | NOM 0.42 | 0.7 | 0.6 |
| 20 | But 13 | BA 9.8 | M2 6 | DVB 0.2 | MMA 59.5 | BA 7 | St 3.5 | NOM 0.42 | 0.7 | 0.6 |
| 21 | BA 16 | MA 1.5 | M1 2 | EDMA 0.5 | MMA 72 | BA 8 | NOM 0.64 | 1.2 | 1.5 |
| 22 | But 8 | OA 8 | C1 4 | | MMA 72 | OA 8 | NOM 0.64 | 0.8 | 0.7 |

The symbols used in Table 5 and all succeeding tables denote the following.
But . . . 1,3-butadiene
Ma . . . methyl acrylate
MMA . . . methyl methacrylate
St . . . styrene
BA . . . butyl acrylate
M1 . . . methoxypolyethylene glycol methacrylate (having an average of 23 ethylene oxide groups)
M2 . . . methoxypolyethylene glycol methacrylate (having an average of 9 ethylene oxide groups)
TDM . . . tertiary dodecylmercaptan
NOM . . . normal dodecylmercaptan
DVB . . . divinylbenzene
C1 . . . polyethylene glycol dimethacrylate (having an average of 23 ethylene oxide groups)
EDMA . . . ethylene glycol dimethacrylate
OA . . . octyl acrylate

COMPARISON EXAMPLES 3 THROUGH 6

The half-life of the charged voltage of each of the commercially available antistatic-grade resins shown in Table 6 was measured by the Static Honest Meter as in the preceding Examples. The results obtained are summarized in Table 6.

TABLE 6

| Comparison Example | Commercially available antistatic-grade resin | Half-life of charged voltage (sec.) | |
|---|---|---|---|
| | | Untreated | Washed with water |
| 3 | AS resin[1] | 18 | >300 |
| 4 | ABS resin[2] (mfd. by A company) | >300 | >300 |
| 5 | ABS resin[2] (mfd. by B company) | 10 | >300 |
| 6 | Polycarbonate | >300 | >300 |

[1] AS resin : acrylonitrile-styrene copolymer
[2] ABS resin : acrylonitrile-butadiene-styrene copolymer

COMPARISON EXAMPLES 7 THROUGH 12

Test specimens were prepared substantially as in Example 2 except that the monomer composition of the graft copolymer used therein was modified as shown in Table 7, and the half-life of the charged voltage was measured by the Static Honest Meter. The results obtained are set forth in Table 7.

In these Comparison Examples 0.5 part each of sodium dodecylbenzenesulfonate was added as a surfactant.

TABLE 7

| Comparison Example No. | Monomer composition (wt. %) | | | | | | | Half-life of charged voltage (sec.) | |
|---|---|---|---|---|---|---|---|---|---|
| | Rubber trunk polymer | | | | Branch polymer | | | Untreated | Washed with water |
| 7 | But 6 | MA 4 | TDM 0.05 | | AN 54 | MA 36 | NOM 3.6 | 180 | >300 |
| 8 | But 11 | BA 9 | | | MMA 68 | BA 8 | St 4 | NOM 0.48 | >300 | >300 |
| 9 | MMA 80 | MA 18 | M1 2 | NOM 0.3 | | | | 2 | >300 |
| 10 | St 96 | M2 4 | NOM 0.3 | | | | | >300 | >300 |
| 11 | But 6 | MMA 72 | MA 20 | M2 2 | NOM 0.3 | | | >300 | >300 |
| 12 | But | BA | TDM | | | | | | |

TABLE 7-continued

| Comparison Example No. | Monomer composition (wt. %) | | | Half-life of charged voltage (sec.) | |
|---|---|---|---|---|---|
| | Rubber trunk polymer | | Branch polymer | Untreated | Washed with water |
| | 60 | 39.5 | 0.5 | 5 | >300 |

EXAMPLES 23 THROUGH 27

To 35 parts each of graft copolymers obtained substantially as in Example 1 except that the monomer composition was modified as shown in Table 8 was added 0.5 part of sodium dodecylbenzenesulfonate, and both were thoroughly mixed in a Henschel mixer. Each resulting mixture and 65 parts each of the thermoplastic resins shown in the same table were kneaded for 3 min. with rolls heated to 160° C. The mixture thus obtained was molded in the same manner as in Example 1 to prepare test specimens.

The results of the measurement of the half-life of the charged voltage by means of the Static Honest Meter are given in Table 8.

TABLE 8

| Example No. | Monomer composition (wt. %) | | | | | | Thermoplastic resin | Half-life of charged voltage (sec.) | |
|---|---|---|---|---|---|---|---|---|---|
| | Ruber trunk polymer | | | Branch polymer | | | | Untreated | Washed with water |
| 23 | But 27 | BA 21 | M2 12 | MMA 40 | NOM 0.32 | | DELPET 60N*1 (Asahi Dow) | 0.6 | 0.6 |
| 24 | But 38 | St 10 | M2 12 | St 30 | AN 10 | NOM 0.32 | TOYOLAC*2 900 (Toray,K.K) | 0.6 | 0.5 |
| 25 | But 38 | MA 10 | M1 12 | AN 20 | MA 20 | NOM 1.6 | TYRIL 780*3 (Asahi Dow) | 0.5 | 0.6 |
| 26 | But 52 | St 20 | M2 8 | St 20 | | | STYLON 666*4 (Asahi Dow) | 0.7 | 0.8 |
| 27 | But 23 | OA 29 | C1 13 | MMA 30 | OA 5 | NOM 0.28 | SUMIPEX*5 BLG (Sumitomo Kagaku,K.K.) | 0.7 | 0.7 |

*1 polymethyl methacrylate resin
*2 acrylonitrile-butadiene-styrene resin
*3 acrylonitrile-styrene resin
*4 polystyrene resin
*5 polymethyl methacrylate resin

EXAMPLES 28, 29 AND 30

The graft copolymer of Example 15 was blended with a polyvinyl chloride compound (100 parts of polyvinyl chloride of average degree of polymerization 700, 2.0 parts of dibutyltin mercaptide, 2.3 parts of a dibutyltin maleate polymer, 0.7 part of stearyl alcohol, and 0.2 part of butyleneglycol montanate) in the ratios shown in Table 9.

To 100 parts each of the polymer blends was added 0.5 part of sodium dioctylsulfosuccinate, and each resulting mixture was kneaded for 3 min. with rolls heated to 160° C.

Test specimens were prepared from each of the thus obtained mixtures in the same manner as in Example 1, and the half-life of the charged voltage was measured similarly. The results are set forth in Table 9.

TABLE 9

| Example NO. | Quantity of graft copolymer blended (part by wt.) | Quantity of PVC blended (part by wt.) | Half-life of charged voltage (sec.) | |
|---|---|---|---|---|
| | | | Untreated | Washed with water |
| 28 | 17 | 83 | 3.0 | 2.8 |
| 29 | 25 | 75 | 0.8 | 0.8 |
| 30 | 34 | 66 | 0.5 | 0.6 |

COMPARISON EXAMPLES 13 THROUGH 16

Test specimens were prepared substantially as in Example 23 except that 0.5 part of sodium dodecylbenzenesulfonate was replaced by 0.5 part each of the surfactants shown in Table 10, and the half-life of the charged voltage was measured by the Static Honest Meter. The results obtained are given in Table 10.

TABLE 10

| Comparison Example No. | Surfactant | Half-life of charged voltage (sec.) | |
|---|---|---|---|
| | | Untreated | Washed with water |
| 13 | $C_{12}H_{25}N^+(CH_3)_3Cl^-$ | 6 | 6 |
| 14 | $C_{12}H_{25}O(CH_2CH_2O)_{20}H$ | 9 | 9 |
| 15 | $C_{17}H_{35}COOCH_2\overset{\mid}{C}H-CH_2-O-CH_2-\overset{\mid}{\underset{\mid}{OH}}\,\,\overset{\mid}{\underset{\mid}{OH}}\\-CH_2-CH-CH_2$ | 8 | 9 |

TABLE 10-continued

| Comparison Example No. | Surfactant | Half-life of charged voltage (sec.) | |
|---|---|---|---|
| | | Un-treated | Washed with water |
| 16 | C$_{12}$H$_{25}$N(CH$_2$CH$_2$O)$_9$H / (CH$_2$CH$_2$O)$_9$H | 7 | 8 |

COMPARISON EXAMPLES 17 THROUGH 20

Test specimens were prepared substantially as in Example 2 except that 0.5 part each of the surfactants shown in Table 11 was added to the graft copolymer used therein, and the half-life of the charged voltage was measured by the Static Honest Meter. The results are tabulated below.

TABLE 11

| Comparison Example No. | Surfactant | Half-life of charged voltage (sec.) | |
|---|---|---|---|
| | | Un-treated | Washed with water |
| 17 | C$_{12}$H$_{25}$N$^+$(CH$_3$)$_3$Cl$^-$ | 12 | 11 |
| 18 | C$_{12}$H$_{25}$O(CH$_2$CH$_2$O)$_{20}$H | 13 | 15 |
| 19 | C$_{17}$H$_{35}$COOCH$_2$CHCH$_2$OCH$_2$CH$_2$CH—CH$_2$ with OH, OH, OH groups | 10 | 11 |
| 20 | C$_{12}$H$_{25}$N(CH$_2$CH$_2$O)$_9$H / (CH$_2$CH$_2$O)$_9$H | 13 | 10 |

EXAMPLES 31 AND 32

Test specimens were prepared substantially as in Example 1 except that the monomer composition of the graft copolymer was modified as shown in Table 12, and that 0.5 part of sodium dioctylsulfosuccinate was added to 100 parts each of the graft copolymer obtained.

The antistatic property of each of the specimens was evaluated by means of the Static Honest Meter, and the results set forth in Table 12 were obtained.

TABLE 12

| Example No. | Monomer composition (wt. %) | | | | | Half-life of charged voltage (sec.) | |
|---|---|---|---|---|---|---|---|
| | Rubber trunk polymer | | | Branch polymer | | Un-treated | Washed with water |
| 31 | But 7 | OA 9 | M3 4 | MMA 80 | NOM 0.64 | 0.8 | 0.9 |
| 32 | But 7 | OA 9 | M4 4 | MMA 80 | NOM 0.64 | 0.9 | 0.8 |

Note:
M3 polyethylene glycol acrylate (having an average of 23 ethylene oxide groups)
M4 methoxypolyethylene glycol acrylamide (having an average of 15 ethylene oxide groups)

EXAMPLES 33 AND 34

Test specimens were prepared substantially as in Example 23 except that the monomer composition of the graft copolymer was modified as shown in Table 13.

The results of the measurement of the half-life of the charged voltage by means of the Static Honest Meter are listed in Table 13.

TABLE 13

| Example No. | Monomer composition (wt. %) | | | | | | Half-life of charged voltage (sec.) | |
|---|---|---|---|---|---|---|---|---|
| | Rubber trunk polymer | | | Branch polymer | | | Un-treated | Washed with water |
| 33 | But 22 | BA 30 | M5 13 | MMA 33 | BA 2 | NOM 0.28 | 0.7 | 0.8 |
| 34 | But 22 | OA 30 | M6 13 | MMA 33 | OA 2 | NOM 0.28 | 0.8 | 0.7 |

Note:
M5 ethoxypolyethylene glycol acrylate (having an average of 15 ethylene oxide groups)
M6 ethoxypolyethylene glycol methacrylamide (having an average of 23 ethylene oxide groups)

We claim:

1. An antistatic resin composition comprising:
   (1) 100 parts of a base resin; and
   (2) 0.1 to 5 parts of an anionic surfactant,
   said base resin comprising
   (A) 7 to 100 parts of a graft copolymer obtained by graft-polymerizing 5 to 95% of at least one ethylenically unsaturated monomer onto 5 to 95% of a rubber trunk polymer which in turn is a copolymer of
      (i) 30 to 90% of an elasticity-imparting monomer selected from the group consisting of conjugated dienes, alkyl acrylates and mixtures thereof,
      (ii) 10 to 70% of a polyalkylene oxide monomer which is a monomer comprising 4 to 500 alkylene oxide groups together with an ethylenic unsaturation, and
      (iii) 0 to 50% of at least one ethylenically unsaturated monomer copolymerizable with the elasticity-imparting monomer, and
   (B) 0 to 93 parts of a thermoplastic resin compatible with said graft copolymer (A),
   said rubber trunk polymer being 5 to 80% of the total of the graft copolymer (A) and the thermoplastic resin (B), all quantities expressed in parts and percentages being by weight.

2. An antistatic resin composition as claimed in claim 1, wherein the anionic surfactant is a salt selected from the group consisting of dialkyl sulfosuccinate salts, alkylbenzene sulfonates, fatty acid salts, alkyl sulfate salts, alkylsulfonates, alkylnaphthalenesulfonates, phosphate salts, ethyl sulfo-fatty carboxylate salts, fatty alcohol sulfate salts, polyoxyethylene alkyl phenol ether sulfate salts and phosphate salts, polyoxyethylene alkyl ether sulfate salts and phosphate salts, and polyoxyethylene phosphate salts.

3. An antistatic resin composition as claimed in claim 1 or 2, wherein the polyethylene oxide monomer is represented by the formula:

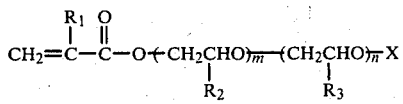

wherein each of $R_1$, $R_2$ and $R_3$ is hydrogen or an alkyl group having 1 to 4 carbon atoms; X is hydrogen, an alkyl group having 1 to 9 carbon atoms, a phenyl group, $SO_3Me$, $SO_2Me$, $PO_3Me_2$,

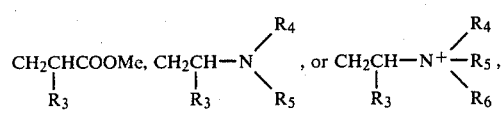

each of $R_4$, $R_5$ and $R_6$ being hydrogen or an alkyl group having 1 to 9 carbon atoms, and Me being hydrogen, Na, Li or K; and m and n are integers that meet the requirement $4 \leq m+n \leq 500$.

4. An antistatic resin composition as claimed in claim 1 or 2, wherein the polyalkylene oxide monomer is represented by the formula:

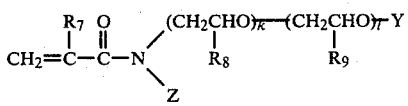

wherein each of $R_7$, $R_8$ and $R_9$ is hydrogen or an alkyl group having 1 to 4 carbon atoms; Y is hydrogen, an alkyl group having 1 to 9 carbon atoms, a phenyl group, $SO_3Me$, $SO_2Me$, $PO_3Me_2$,

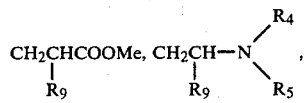

or

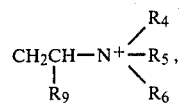

each of $R_4$, $R_5$ and $R_6$ being hydrogen or an alkyl group having 1 to 9 carbon atoms, and Me being hydrogen, Na, Li or K; and Z is hydrogen, an alkyl group having 1 to 40 carbon atoms, a cycloalkyl group having 3 to 6 carbon atoms, a phenyl group, or

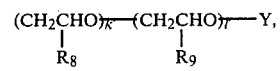

k and l being integers that meet the requirement $4 \leq k+l \leq 500$, and k' and l' being integers that meet the requirement $4 \leq k'+l' \leq 500$.

5. An antistatic resin composition as claimed in claim 1, wherein the polyalkylene oxide monomer is represented by the formula:

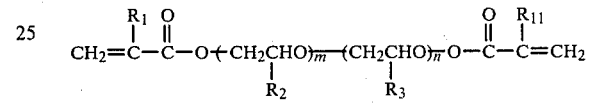

wherein each of $R_1$, $R_2$, $R_3$ and $R_{11}$ is hydrogen or an alkyl group having 1 to 4 carbon atoms; and m and n are integers that meet the requirement $4 \leq m+n \leq 500$.

6. An antistatic resin composition as claimed in claim 1, wherein the polyalkylene oxide monomer comprises a polyethylene oxide block consisting of 4 or more ethylene oxide groups.

7. An antistatic resin composition as claimed in claim 6, wherein the alkylene oxide groups in the polyalkylene oxide monomer consist of ethylene oxide groups.

8. An antistatic resin composition as claimed in claim 1, wherein the polyalkylene oxide monomer comprises 6 to 50 alkylene oxide groups.

9. An antistatic resin composition as claimed in claim 1, wherein the composition comprises 100 parts of the base resin and 0.2 to 5 parts of the anionic surfactant, said base resin comprising 10 to 100 parts of said graft copolymer (A) obtained by graft-polymerizing 20 to 92% of said at least one ethylenically unsaturated monomer onto 8 to 80% of said rubber trunk polymer which in turn is a copolymer of (i) 50 to 90% of said elasticity-imparting monomer, (ii) 10 to 50% of said polyalkylene oxide monomer, and (iii) 0 to 50% of said at least one ethylenically unsaturated monomer; and 0 to 90 parts of said thermoplastic resin (B), said rubber trunk polymer being 5 to 60% of the total of the graft copolymer (A) and the thermoplastic resin (B).

* * * * *